July 27, 1943.     O. FOLLENDER     2,325,312
TIME MEASURING INDICATOR
Filed Dec. 5, 1940
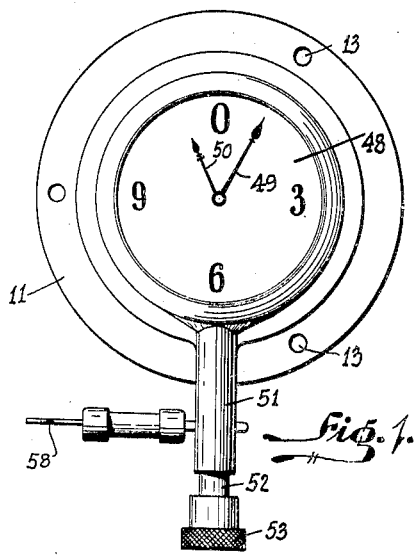
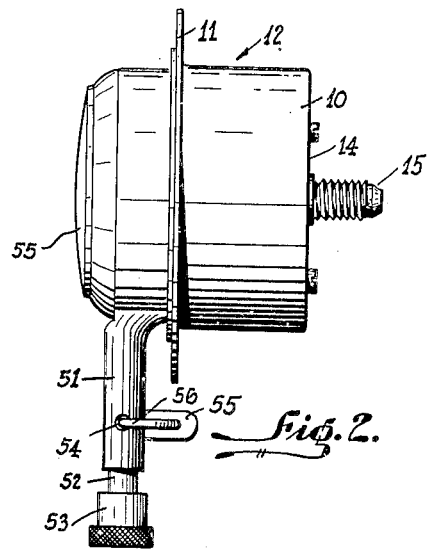
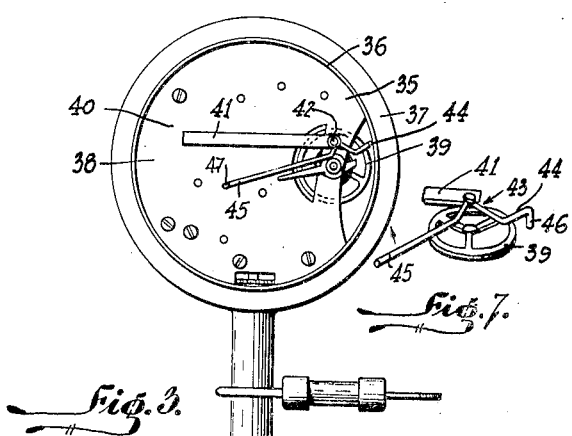
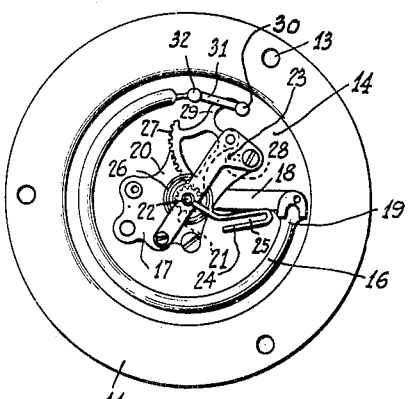
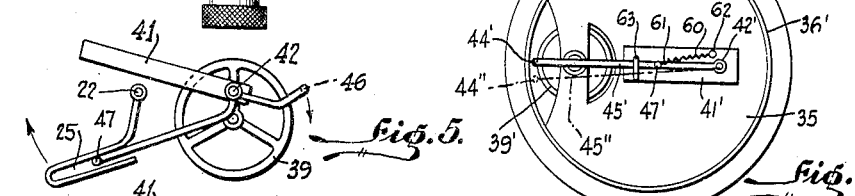
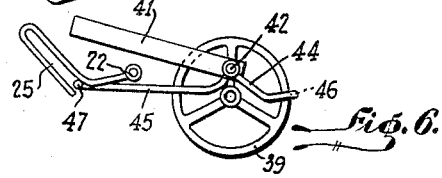
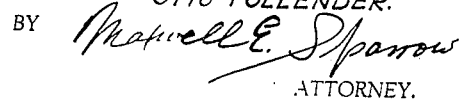
INVENTOR.
OTTO FOLLENDER.
BY Maxwell E. Sparrow
ATTORNEY.

Patented July 27, 1943

2,325,312

UNITED STATES PATENT OFFICE 2,325,312

TIME MEASURING INDICATOR

Otto Follender, East Islip, N. Y.

Application December 5, 1940, Serial No. 368,579

2 Claims. (Cl. 161—15)

This invention relates generally to time measuring indicators and more particularly to indicators for measuring the running time of vehicles and the like.

It is an object of the present invention to provide a very simple, practical, economical and efficient indicator for registering the time in which the engine of the vehicle is in operation. The invention is particularly adapted for use in connection with registering or indicating the total flying time of aircraft, that is, in recording the time periods of operation of the vehicle.

It is another object of the present invention to provide an indicator of the above-mentioned type with a clockwork mechanism and associated mechanism controlling the balance wheel of the clockwork mechanism by brake-action on the periphery of the flywheel.

It is yet another object of the present invention to provide a time period indicator having a clockwork mechanism with control means adapted to apply against the periphery of the balance wheel of the clockwork mechanism for stopping the same or for giving the same an impetus for putting said mechanism in operation.

It is a still further object of the present invention to provide a running-time indicator for vehicles which is resettable to zero and which is provided with a clockwork mechanism controlled by positive action on the periphery of its balance wheel to function the indicator at initial starting time and to continue the time measurement for the period the vehicle is in use and to then automatically make inoperative the indicator at the end of said period.

Another object of the present invention resides in the provision of leverage-control means to start and stop the clockwork mechanism of a running-time indicator for vehicles, the said control means acting upon the periphery of the balance wheel, being made operative by the actuation of a tubular member influenced by pressure and the like.

A still further object of the present invention is to provide a control means for the balance wheel of clockwork mechanism capable of stopping the balance wheel by engaging the periphery thereof and giving the balance wheel a positive start by pushing action against the same before freeing itself from the periphery of the balance wheel to facilitate the starting of the latter in motion.

And still another object of the present invention resides in providing locking means to prevent surreptitious resetting of the indicator.

With the aforesaid and other objects in view, the invention consists in the novel combination and arrangement of parts hereinafter more particularly described, pointed out in the subjoined claims, and illustrated in the annexed drawing, wherein like parts are designated by the same reference characters or numerals throughout several views, and in which:

Fig. 1 is a front elevational view of an indicator made in accordance with the invention;

Fig. 2 is a side elevational view of the same;

Fig. 3 is a view illustrating the front including the clockwork portion of the said device;

Fig. 4 is a rear view illustrating the actuating means for the balance wheel control of the said device including a conventional pressure recording gauge.

Fig. 5 is a diagrammatic view showing the disengaging position of the balance wheel control;

Fig. 6 is a diagrammatic view showing the engaging position of the balance wheel control; and Fig. 7 shows the actuating means for the balance wheel control in a modified form; and Fig. 8 shows an embodiment of the invention in a modified form.

In the drawing which discloses one example by which the invention may be realized, there is shown a housing 10 having an annular flange 11 for attaching the indicator 12 through holes 13 to the instrument board or other suitable member of the vehicle or other apparatus whose period of running time is to be measured.

The rear wall 14 of housing 10 has an opening through which projects a threaded tube or nipple 15 for connection with a source of pressure supply which may be the exhaust or oil system of the vehicle, or for connection with any point of differentiation of pressure which would cause reaction in a pressure sensitive instrument such as for example, a Bourdon tube 16. Nipple 15 forms part of a base member 17 which abuts against the rear wall 14 of housing 10, member 17 having an arm 18 to which is secured one end 19 of tube 16. Member 17 including its arm 18 has a passage (not shown but conventional) providing communication between the opening in nipple 15 and the inside of the tube 16. It is evident that any increase in pressure within tube 16 will cause the latter to end to straighten itself and upon the removal of such increase in pressure the said tube will return to its normal stable condition.

Secured to base member 17 is a frame 20 in which is rotatably mounted a pinion 21 fixed to a shaft 22 projecting from the element 23 of frame 20. Secured to the projecting end of shaft 22 is an arm 24 bent to provide a space 25 between portions thereof. One end of a spring 26 is fixed to frame 20 and the other end thereof is fixed to pinion 21 whereby to return arm 24 to its original position for a purpose later on described. Pivotally or rotatably mounted in frame 20 is a toothed segment 27 having its teeth constantly in mesh with the teeth of pinion 21, a stop 28 being provided on frame 20 against which segment 27 will abut to limit its movement in one direction of its rotation when the arm 24 is caused to be moved in the opposite direction as will be understood hereafter. Segment 27 has an extension 29 to which is pivotally connected at 30 one end of a link 31, the other end of link 31 being pivotally connected at 32 to the free end of tube 16. In the embodiment of the invention disclosed in the drawing, arm 24 is in one rotative position for one stage of operation of the indicator and may be impelled into another rotative position (against the action of spring 26) through link 31, segment 27 and pinion 21 by an increase of pressure flow within tube 16.

A case 35 has a ring portion 36 and an annular flange portion 37, the former being in tight fitting engagement with housing 10 and the latter abutting against the flange 11 of housing 10, when the case and housing are in assembled condition.

Within case 35 is a conventional clockwork mechanism 38 having the conventional balance wheel 39. Secured to a plate 40 of the clockwork mechanism 38 is a bracket 41 upon which is fulcrummed at 42 a lever 43 having two arms 44, 45. Arm 44 has a bent portion 46 made of fine wire or other thin tensile material adapted for engagement with the periphery of balance wheel 39 when the lever 43 is rotated about its pivot 42 in one direction to stop the operation of the balance wheel 39 and which is disengageable from the latter by rotation of the lever 43 in an opposite direction. In disengaging from the balance wheel 39, arm portion 46 will give the latter a slight push or impetus thus assuring that the balance wheel will be set in motion again upon its release from engagement with arm portion 46.

Arm 45 of lever 43 has a bent portion 47 projecting within space 25 of bent arm 24.

Secured to case 35 is the face or dial 48 of the watch or clock over which is disposed the transparent plate 55. The dial 48 has a plurality of markings 49 representing divisions of a twelve hour period or other suitable period of time. The hands 49, 50 rotatable over the dial 48 by the clockwork mechanism, may be conventional. Projecting from case 35 is a tubular extension 51 through which extends an elongated spring-winding and time-setting stem 52 having a knurled finger grip 53. The winding and setting is performed in a conventional manner. To prevent the indicator from being tampered with in respect to its stem-winding and time-setting operations, there is preferably provided a lock 55 having its bolt portion 56 projecting through the holes 54 of the stem 52 and extension 51.

Assume that the indicator is employed to record the flying time of an aircraft. By means of stem 52 the clockwork mechanism is set to the time of take-off. The tube 16 being in normal condition, spring 26 holds arm 24 and consequently arm 45 of lever 43 in such position that arm 44, 46 of lever 43 is in engagement with the periphery of balance wheel 39 and exerts a break action thereon. As soon as the aircraft engine is put in operation, pressure will flow into curved tube 16 tending to straighten it. In doing so, segment 27 will rotate causing pinion 21 and shaft 22 and consequently arm 24 to rotate therewith. Lever 43 will rotate about its pivot 42 not only disengaging arm portion 46 from the periphery of balance wheel 39, but also giving the latter a slight "kick" or push thus assuring that the balance wheel will be put in motion. The recording time will now commence to run. After the aircraft has finished its flight, stopping of the engine will release the pressure from within tube 16 and the latter in assuming its normal condition will rotate segment 27 and through it pinion 21 in the opposite direction, being assisted for this purpose by spring 26. Thus the levers 24 and 43 will be actuated and cause portion 46 to be again in breaking contact with the periphery of balance wheel 39 and stop the motion thereof.

In the embodiment of the invention just described a curved tube 16 has been employed, which by its expansion and retraction will operate pinion 21 which in turn will swing forked arm 24, thereby either starting or stopping the balance wheel. Although the employment of this tube is preferable, it is understood that the same may be substituted by any other practical means capable of performing the function of causing engagement and disengagement of a lever arm with the periphery of the balance wheel.

Referring to the embodiment of Fig. 8, bracket 41' has an arm 45' fulcrummed at 42' with its bent portion 44' adjacent the perimeter of balance wheel 39'. A stop 63 serves as the limits to movement in either direction of arm 45'. Pin 47' holds one end 61 of a spring 60 which is fastened beyond point 42' to a pin 62 on bracket 41'. Spring 60 should be in line position with arm 45' when 45' is midway between stop and run position. This will serve to draw lever arm 45' either one way or the other depending upon which way lever arm 25 (Figs. 5, 6) is moved, the movement being more sudden than produced in Figs. 5 and 6, and therefore, more positive. The dot-dash line 45'' shows the running position of lever arm, 44'' indicating the bent portion of arm 45''. Case 35 has the ring portion 36'.

Although the drawing and the above specification disclose the best mode in which the invention is at present contemplated and embodied, it is desired that the invention in no way be limited to the details of such disclosure, for in the further practical application of the invention many changes in the forms and proportions may be made as circumstances require or experience suggests without departing from the spirit of the invention within the scope of the appended claims.

Having thus described the invention, what is claimed as new and desired to be secured by Letters Patent, is:

1. A running-time indicator comprising clockwork mechanism, and means to start and stop said mechanism by action upon the periphery of the balance wheel of said mechanism, said means comprising a pressure-actuated member, a rotatable toothed element, means connecting said element with said member, a rotatable toothed member engaging said element, an arm fixed to said toothed member, and a lever movable by said arm and engageable with said balance wheel.

2. A running-time indicator comprising clockwork mechanism, and means to start and stop said mechanism by action upon the periphery of the balance wheel of said mechanism, said means comprising a pressure-actuated member, a rotatable toothed element, means connecting said element with said member, a rotatable toothed member engaging said element, an arm fixed to said toothed member, a lever movable by said arm and engageable with said balance wheel, and resilient means for normally maintaining said lever against the periphery of said balance wheel.

OTTO FOLLENDER.